United States Patent [19]
Van Ert

[11] Patent Number: 5,674,445
[45] Date of Patent: Oct. 7, 1997

[54] PROCESS FOR MANUFACTURE OF DECORATED PANELS FOR VEHICLE INTERIORS

[75] Inventor: Jack Van Ert, Sheboygan, Wis.

[73] Assignee: Lear Corporation, Southfield, Mich.

[21] Appl. No.: 484,694

[22] Filed: Jun. 7, 1995

Related U.S. Application Data

[63] Continuation of Ser. No. 6,514, Jan. 21, 1993, abandoned, which is a continuation of Ser. No. 818,685, Jan. 7, 1992, abandoned, which is a division of Ser. No. 673,539, Mar. 22, 1991, abandoned.

[51] Int. Cl.⁶ ............................................. B29C 65/00
[52] U.S. Cl. ................... 264/249; 264/163; 264/259; 156/212; 156/228; 156/245; 156/580; 425/408; 425/412
[58] Field of Search ............................ 156/245, 212, 156/228, 580; 264/249, 243, 259, 257, 163; 425/408, 412

[56] References Cited

U.S. PATENT DOCUMENTS

| | | | |
|---|---|---|---|
| 3,058,154 | 10/1962 | Howard et al. | 156/222 |
| 4,722,760 | 2/1988 | Shimada | 156/214 |
| 4,779,390 | 10/1988 | Repper. | |
| 4,781,956 | 11/1988 | Zimmerman | 428/43 |
| 4,802,948 | 2/1989 | Zimmerman | 156/500 |
| 4,810,452 | 3/1989 | Taillefert | 264/247 |
| 4,873,045 | 10/1989 | Fujita et al. | 264/259 |
| 4,923,539 | 5/1990 | Spengler | 156/79 |
| 4,978,407 | 12/1990 | Ardissone. | |

FOREIGN PATENT DOCUMENTS

| | | | |
|---|---|---|---|
| 0639500 | 4/1962 | Canada. | |
| 0348357 | 12/1989 | European Pat. Off.. | |
| 0221737 | 12/1983 | Japan | 296/39.1 |

*Primary Examiner*—Merrick Dixon
*Attorney, Agent, or Firm*—Brooks & Kushman P.C.

[57] ABSTRACT

Decorated panels for automobile interiors, including method, apparatus and a manufacture of a formed decorative panel insert assembly with down turned edge and the decorative panel insert assembly attached to mounting panel stock by embedment of the down turned edge in a groove in the mounting panel stock and pimple protrusions and projecting flange edge coined into the groove sidewall of the mounting panel stock.

6 Claims, 3 Drawing Sheets

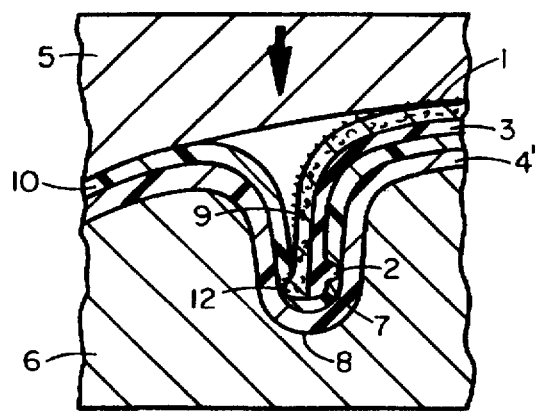
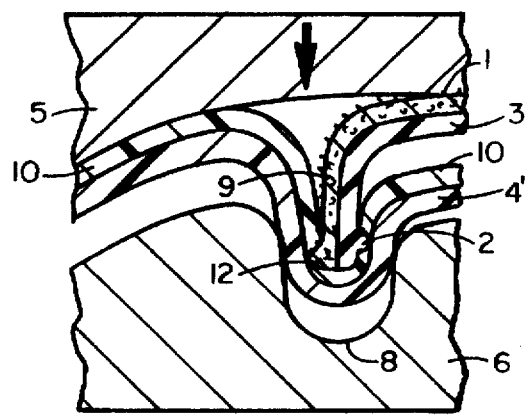
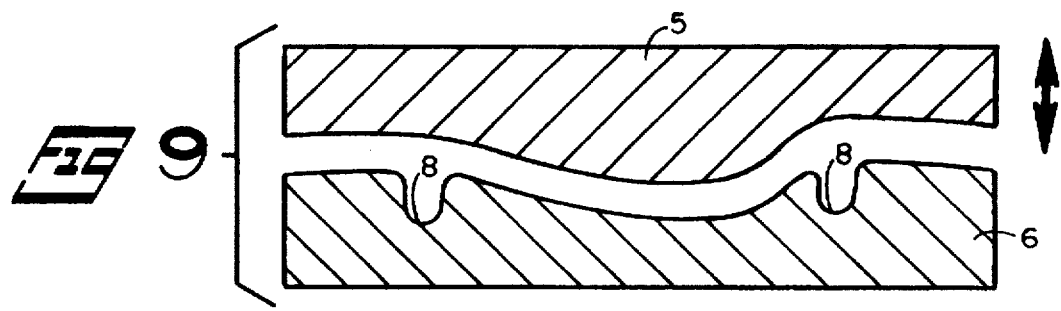
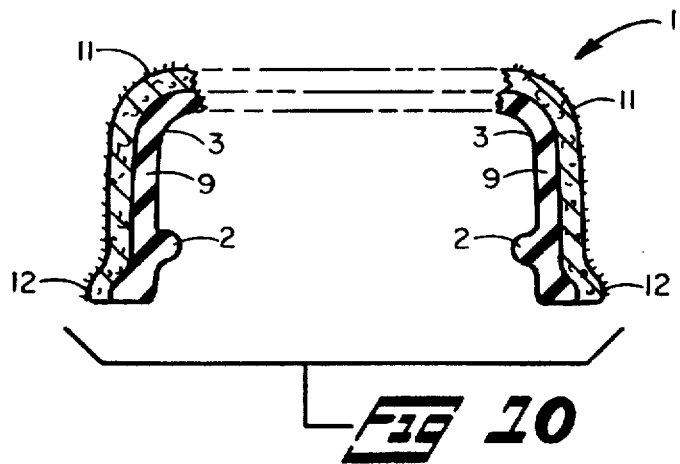

PROCESS FOR MANUFACTURE OF DECORATED PANELS FOR VEHICLE INTERIORS

This application is a continuation of U.S. Ser. No. 08/006,514, filed Jan. 21, 1993, now abandoned, Sep. 5, 1995 which is a continuation of U.S. Ser. No. 07/818,685, filed Jan. 7, 1992, now abandoned, which in turn is a divisional of U.S. Ser. No. 07/673,539, filed Mar. 22, 1991, now abandoned.

SUMMARY OF TECHNICAL FIELD

The disclosure herein relates to decorative panels for automobiles, aircraft, and similar interiors, wherein one or more decorated formed panels are joined to a larger panel. For example automobile door interior panels are usually decorated in various ways, including decorative panels, and such panels may be of a sheet of formed plastic or metal, over which may be applied a decorative panel portion by means of adhesive or possibly a molding strip.

Disclosure is made herein of a unique apparatus and method of joining a decorative panel insert to a mounting panel, by embedment of down turned edges of a decorative panel insert assembly to the mounting panel stock, and the product derived therefrom.

BACKGROUND OF THIS INVENTION

Decorative panels have been in use for a long time, particularly in automobiles, for sound and weather proofing.

Prior art patents pertaining to this subject are;

U.S. Pat. No. 4,779,390, for "LINING FOR THE INTERIOR OF AN AUTOMOBILE VEHICLE". This patent discloses a foundation panel partitioned into at least two contiguous surface areas by a groove and webs of material laminated on the foundation areas and a seam is provided between them and tucking portions of the web into the groove and the web is superposed on an adhesive coating.

U.S. Pat. No. 4,781,956, for "INTERIOR TRIM COMPONENT FOR A MOTOR VEHICLE". Disclosure is made in this patent of a fibrous mat attached to the panel, with various amounts of compression on various areas of the mat.

U.S. Pat. No. 4,873,045 for "METHOD FOR MANUFACTURING AUTOMOTIVE INTERIOR COMPONENTS". Disclosure is made in this patent of a urethane foam, cold pressed on a semi molten thermoplastic resin material.

U.S. Pat. No. 4,978,407/E.P. 0 348 357 A2 for "LAMINATED PANELS. Describes decorative surface on substrate, and having fold over surface.

Other U.S. patents for the record are;

U.S. Pat. No. 4,802,948

U.S. Pat. No. 4,810,452

U.S. Pat. No. 4,923,542

U.S. Pat. No. 4,923,539 Canadian patent #639,500.

Japanese patent #0221737 Issued Dec. 23, 1983.

OBJECTS OF THIS INVENTION

An object of this invention is to disclose a method and apparatus for a manufacture of a decorated panel having a decorative panel insert assembly attached to the panel by means of down turned edge of the decorative panel insert assembly and pimple protrusions on the inner edge and projecting flange edge on the outer edge of the down turned edge of the panel insert assembly and the down turned edge of the decorative panel insert assembly embedded into a groove formed by forcing the down turned edge of the decorative panel insert assembly into mounting panel stock.

Another object is to disclose apparatus for attaching a decorative panel insert assembly to mounting panel stock by means of a press to force down turned edge of the decorative panel insert assembly into heat softened mounting panel stock and forcing the down turned edge of the decorative panel insert assembly into the mounting panel stock by means of a press having a stationary female die section, having therein a groove of the same perimeter shape as the down turned edge of the decorative panel insert assembly, and the heat softened mounting panel stock laid on a female die section, and the decorative panel insert assembly at ambient or room temperature, having the down turned edge of the decorative panel assembly facing the heat softened mounting panel stock with the down turned edge aligned with the groove in the female die section and a male die section mounted on the movable platen and on closing the die in the press, the down turned edge of the decorative panel insert assembly is embedded into the heat softened mounting panel stock forced into the groove in the female die section, and the pimple protrusions and projecting flange edge coin into the vertical wall of the softened mounting panel stock in the groove.

Another object is to disclose pimple protrusions on the inner surface of the down turned edge of the decorative panel insert assembly, and projecting flange edge on the outer surface of the down turned edge and the pimple protrusions and projecting edge flange embed or are coined into the groove wall of the mounting panel stock.

Another object is to disclose, as a manufacture, a decorated panel for automobiles of a decorative panel insert assembly having a down turned edge and pimple protrusions on the inner surface of the down turned edge and a projecting flange edge on the outer surface of the down turned edge of the decorative panel insert assembly embedded into and the pimple protrusions and projecting flange edge coined into the mounting panel stock of thermoplastic.

BRIEF DESCRIPTION OF DRAWINGS

FIG. 7—Magnified cross section view of fitting of decorative panel insert assembly in groove of formed mounting panel stock in closed die.

FIG. 8—Magnified cross section view of formed decorative panel insert assembly down turned edge and partially formed groove of mounting panel stock.

FIG. 9—Cross section view of forming die sections.

FIG. 10—Magnified cross section view of formed decorative panel insert assembly showing down turned edge and pimple protrusions and projecting flange edge.

IDENTIFICATION OF TERMS

The words "edge" and "edges" may be used interchangeably.

"Platen die sections", includes dies mounted on a platen, and to mention the "die", this includes its "mounting on the platen".

"Down turned edge" may be used interchangeably with "turned down edge", and "downward turned edges".

DETAILED DESCRIPTION OF DRAWINGS

Figure 1:
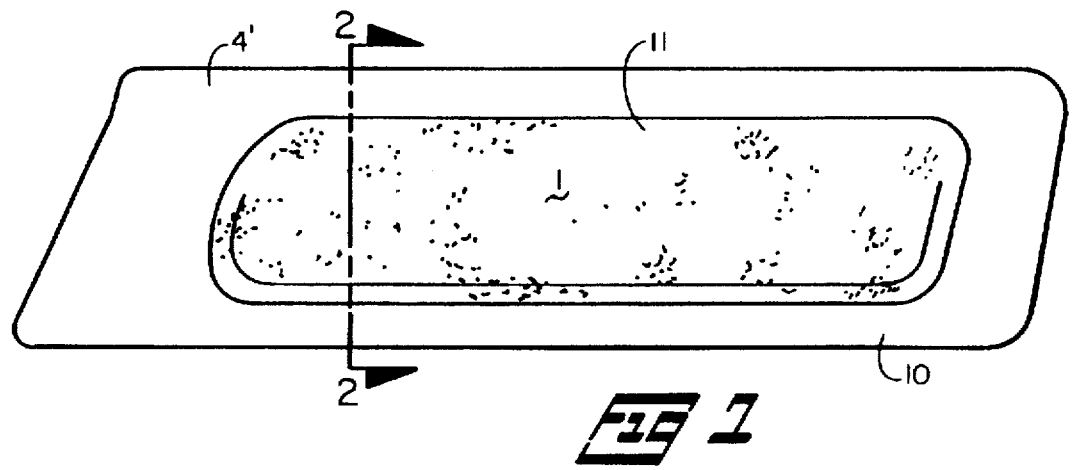
FIG. 1—Face elevation view of assembled decorated panel

FIG. 1—Face elevation view of assembled decorated panel.
  1—Decorative panel insert assembly.
  4'—Formed mounting panel stock.
  10—Decorative overlay sheet.
  11—Decorative surface of panel insert assembly.
  12—Projecting flange edge on outer edge of down turned edge of decorative panel insert assembly.

Figure 2:
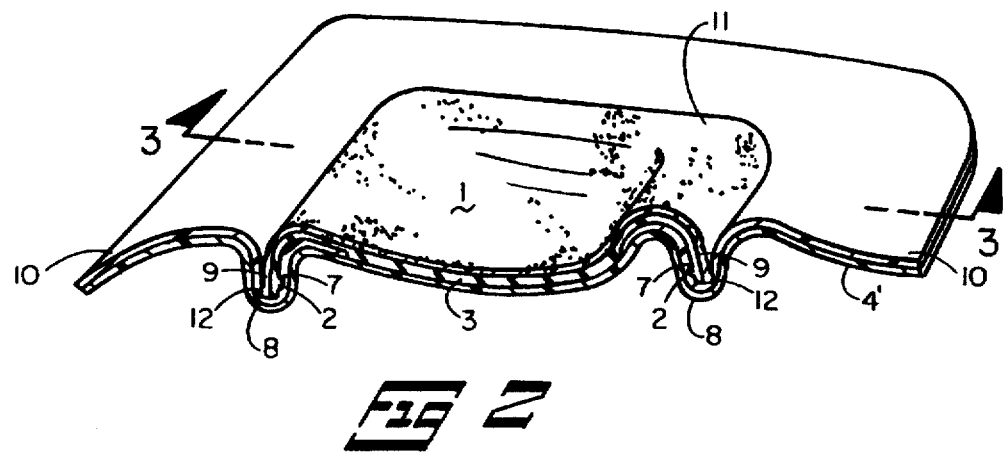
FIG. 2—Cross section perspective view of assembled decorated panel.

FIG. 2—Cross section perspective view of assembled decorated panel.
  1—Decorative panel insert assembly.
  2—Pimple protrusions on back edge of backing of decorative panel insert assembly.
  3—Backing of formed decorative panel insert assembly.
  4'—Formed mounting panel stock.
  7—Dimple from protrusions on back of down turned edge of decorative panel insert assembly.
  8—Groove.
  9—Down turned edge of decorative panel insert assembly.
  10—Decorative overlay sheet on mounting panel stock.
  11—Decorative surface of panel insert assembly.
  12—Projecting flange edge on outer edge of down turned edge of decorative panel insert assembly.

Figure 3:
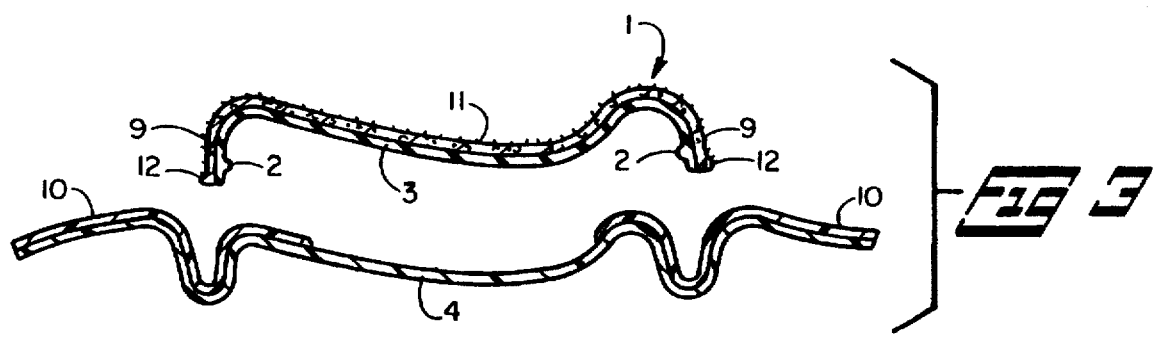
FIG. 3—Exploded cross section view of decorative panel insert assembly to fit into mounting panel stock.

FIG. 3—Exploded cross section view of decorative panel insert assembly to fit into mounting panel.
  1—Decorative panel insert assembly.
  2—Pimple protrusions on back edge of backing of decorative panel insert assembly.
  3—Backing of formed decorative panel insert assembly.
  4'—Formed mounting panel stock.
  9—Down turned edge of decorative panel insert assembly.
  10—Decorative overlay sheet on mounting panel stock.
  11—Decorative surface of panel insert assembly.
  12—Projecting flange edge on outer edge of down turned edge of decorative panel insert assembly.

Figure 4:
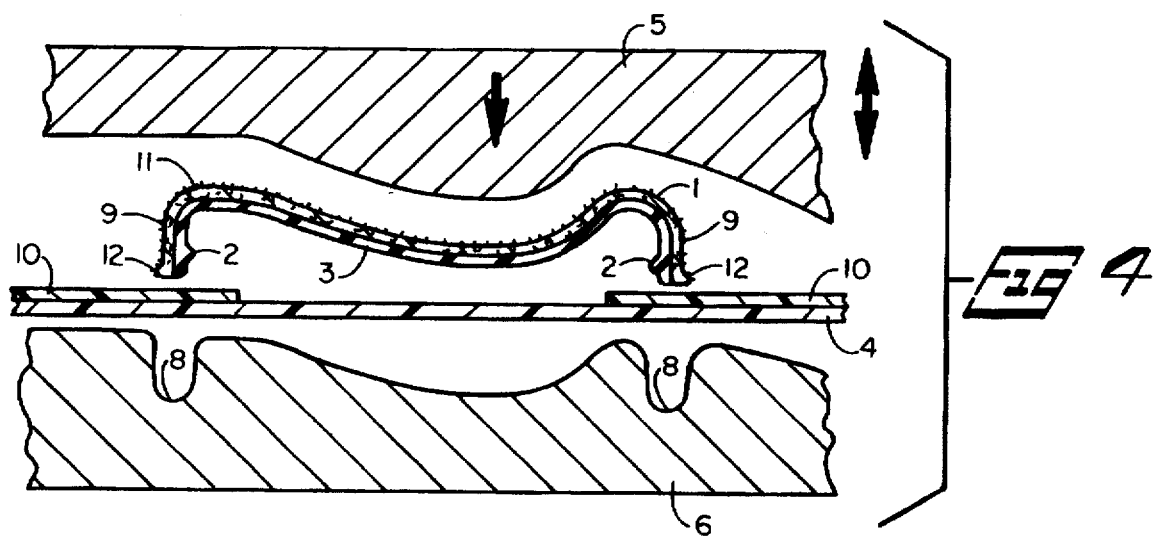
FIG. 4—Cross section view of forming die and decorative panel insert assembly before closing of forming die.

FIG. 4—Cross section view of forming die and decorative panel insert assembly before closing of forming die.
  1—Decorative panel insert assembly.
  2—Pimple protrusions on back edge of backing of decorative panel insert assembly.
  3—Backing of formed decorative panel insert assembly.
  4—Mounting panel stock.
  5—Movable platen die section.
  6—Stationary platen die section.
  8—Groove.
  9—Down turned edge of decorative panel insert assembly.
  10—Decorative overlay sheet on mounting panel stock.
  11—Decorative surface of panel insert assembly.
  12—Projecting flange edge on outer edge of down turned edge of decorative panel insert assembly.

Figure 5:
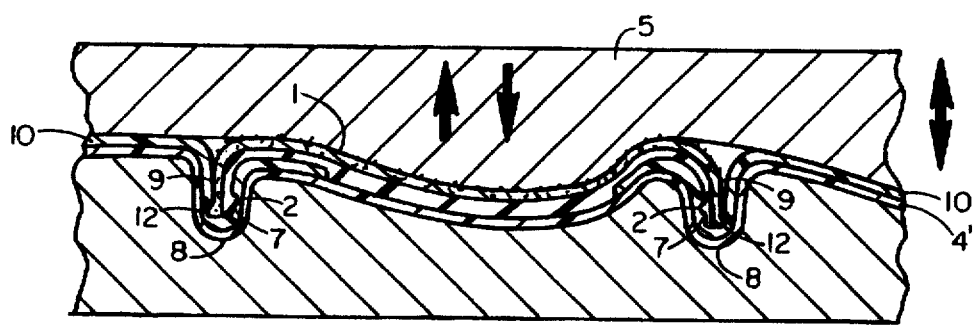
FIG. 5—Cross section view of forming die in closed position with completed formed decorated panel.

FIG. 5—Cross section view of forming die in closed position, with completed formed decorated panel.
  1—Decorative panel insert assembly.
  2—Protrusions on back of down turned edge of decorative panel insert assembly.
  3—Backing of formed decorative panel insert assembly.
  4'—Formed mounting panel stock.
  5—Movable platen die section.
  6—Stationary platen die section.
  7—Dimples from protrusions on back edge of down turned edge of decorative panel insert assembly.
  8—Groove.
  9—Down turned edge of decorative panel insert assembly.
  10—Decorative overlay sheet on mounting panel stock.
  11—Decorative surface of panel insert assembly.
  12—Projecting flange edge on outer edge of down turned edge of decorative panel insert assembly.

Figure 6:
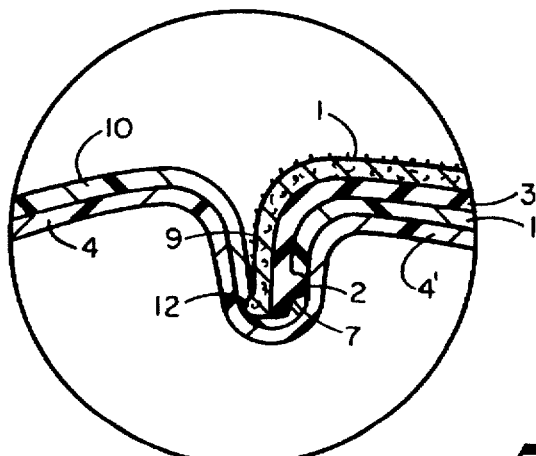
FIG. 6—Magnified cross section view of fitting of decorative panel insert assembly in groove of formed mounting panel stock.

FIG. 6—Magnified cross section view of fitting of down turned edge of decorative panel insert assembly in groove of formed mounting panel stock.
  1—Decorative panel insert assembly.
  2—Pimple protrusions on back of down turned edge of decorative panel insert assembly.
  3—Backing of formed decorative panel insert assembly.
  4'—Formed mounting panel stock.
  7—Dimples from protrusions on back edge of down turned edge of decorative panel insert assembly.
  9—Down turned edge of decorative panel insert assembly.
  10—Decorative overlay sheet on mounting panel stock.
  11—Decorative surface of decorative panel insert assembly.
  12—Projecting flange edge on outer edge of down turned edge of decorative panel insert assembly FIG. 7—Magnified cross section view of fitting of decorative panel insert assembly in groove of formed mounting panel stock in closed die.
  1—Decorative panel insert assembly.
  2—Pimple protrusions on back of down turned edge of decorative panel insert assembly.
  3—Backing of formed decorative panel insert assembly.
  4'—Formed mounting panel stock.
  5—Movable platen die section.
  6—Stationary platen die section.
  7—Dimple from protrusion on back edge of down turned edge of decorative panel insert assembly.
  8—Groove.
  9—Down turned edge of decorative panel insert assembly.
  10—Decorative overlay sheet on mounting panel stock.
  11—Decorative surface of decorative panel insert assembly.
  12—Projecting flange edge on outer edge of down turned edge of decorative panel insert assembly.

FIG. 8—Magnified cross section view of formed decorative panel insert assembly down turned edge and partially formed groove of mounting panel stock.
  1—Decorative panel insert assembly.
  2—Protrusions on back of down turned edge of decorative panel insert assembly.
  3—Backing of formed decorative panel insert assembly.

4"—Partially formed mounting panel stock.
6—Stationary platen die section.
7—Dimple from protrusion on back edge of down turned edge of decorative panel insert assembly.
8—Groove.
9—Down turned edge of decorative panel insert assembly.
10—Decorative overlay sheet on mounting panel stock.
11—Decorative surface of decorative panel insert assembly.
12—Projecting flange edge on outer edge of down turned edge of decorative panel insert assembly.

FIG. 9—Cross section view of forming die.
5—Movable platen die section.
6—Stationary die section.
8—Groove.

FIG. 10—Magnified cross section view of down turned edge of formed decorative panel insert assembly showing pimple protrusions on the inside and projecting edge flange on the outside of the down turned edge.
2—Pimple protrusions on back of down turned edge of decorative panel insert assembly.
3—Backing of formed decorative panel insert assembly.
9—Down turned edge of decorative panel insert assembly.
11—Decorative surface of panel insert assembly.
12—Projecting flange edge on outer edge of down turned edge of decorative panel insert assembly.

DESCRIPTION OF PREFERRED EMBODIMENT OF THIS INVENTION

Decorated panels for automobile interiors now usually include a decorative section, or segment, attached to a mounting panel.

An elevation side view of a decorated panel is shown in FIG. 1, wherein the decorative panel insert assembly 1, is attached to mounting panel stock 4, by the method and apparatus of this invention.

The disclosure of apparatus, method, and product which follows, includes a movable platen die section 5, and stationary platen die section 6, which die sections are mounted in a conventional compression press. No further description will be made of the compression press, as such is well known.

In the following discussion the decorative panel insert assembly 1, includes the decorative surface of panel insert assembly 11, and backing of formed decorative insert 3.

To further describe this invention, it is to be pointed out that the backing of formed decorative insert 3, of the decorative panel insert assembly 1, and mounting panel stock 4, are made of sheet stock of a thermoplastic, such as a polyolefin, preferably polypropylene, with fiber reinforcement such as wood fibers, glass fibers, or plasic fibers.

Such fiber reinforced material may have the following physical properties:

| Impact (Joules) | 8.0 |
| Density range | 0.95–1.07 |
| Hardness (ASTM 02250) | 82 (Shore A) |
| | 72 (Shore D) |
| Mod. of Elasticity | 0.3 (G.Pa)(ASTM 0638-80) |
| Flexural strength (M Pa) | 33–40 |

The backing 3, of formed decorative insert assembly, and the mounting panel stock 4 may have a thickness from about 0.04 to 0.4 inches (1.0 to 10. mm) more or less.

FIG. 1 shows a side elevation view of a complete decorated interior panel for a car door, while FIG. 2, is a cross section view of such decorated panel of this invention, showing in particular the decorative surface 11, of decorative panel insert assembly 1, and backing 3 of formed decorative panel insert assembly.

The decorative surface 11, of decorative panel insert assembly 1 is attached to backing 3, and this assembly is heat formed to include down turned edge 9, on the outer periphery of this decorative panel insert assembly.

The assembly of decoration surface 11, of decorative panel insert assembly 1, and the backing 3 of the decorative assembly is of such form that includes down turned edge 9, of the decorative panel insert assembly 1. The decoration surface 11 is usually a type of woven or non-woven fabric, and is attached to the backing 3 by well known means such as hot pressing, or hot or cold adhesive. The backing 3 of the formed decorative panel insert assembly 1 of this invention can be a fiber or wood flour filled polyolefin thermoplastic such as polypropylene and as such is a conventional material.

The above decorative panel insert assembly 1 is formed in a die and press to any desired surface shape and to have a whole or partial perimeter of a down turned edge 9 and including pimple protrusions 2 on the inner or back edge and projecting flange edge 12, on the outer edge of down turned edge 9.

This formed assembly is then the decorative panel insert assembly 1 for subsequent attachment to mounting panel stock 4, which is the invention of this disclosure.

Mounting panel stock 4, is of thermoplastic, preferably polyolefin, such as polypropylene, filled with various fibers such as glass, or wood fibers.

The decorative panel insert assembly 1, formed with down turned edge 9, at ambient or room temperature is rigid, as indicated by the above data, and is attached to mounting panel stock 4, as described below.

Mounting panel stock 4, is heated to softening at about 330° to 350° F. and subsequently laid on stationary female die section 6, having groove 8 on the mating surface, and the decorative panel insert assembly 1, placed on heat softened mounting panel stock 4, with the down turned edge 9 perimeter matching the perimeter of groove 8, and movable die section 5, having a shape conforming to the shape of the decorative panel insert assembly forces by action of press closing the down turned edge 9 of the decorative panel insert assembly 1, to be embedded into mounting panel stock 4, in groove 8 and pimple protrusions 2 and projection flange edge 12 coin or embed into the side wall of mounting panel stock 4' in groove 8. On cooling of mounting panel stock 4' with decorative panel insert assembly attached thereto in the press die, the decorative panel insert assembly is rigidly attached by embedment to the formed mounting panel stock 4'.

Referring now to FIG. 4, this illustrates mounting panel stock 4 between the die sections 5 and 6, and FIG. 5 illustrates the formed mounting panel stock 4' with the down turned edge 9 of decorative panel insert assembly embedded into the mounting panel stock 4' and pimple protrusions 2 and projecting flange edge 12 on down turned edge 9, coined into the side walls of formed groove in mounting panel stock 4'.

FIG. 8 illustrates a magnified cross section view of partially formed mounting panel stock 4", just prior to full close of the die sections.

FIG. 7 illustrates the embedding of the decorative panel insert assembly 1 into the formed mounting panel 4' in groove 8, and the coining of pimple protrusions 2 and projecting flange edge into mounting panel stock wall 7, in groove 8.

Pimple protrusions 2, on down turned edge 9 of decorated panel insert assembly 1 are preferably located on the back or concave side of the panel 1, while the projecting flange edge 12 is on the outer edge of down turned edge 9. The pimple protrusions 2 on the down turned edge 9 of decorative panel insert assembly 1 are for example, small button or pimple like protrusions of about one-eighth inch in diameter, and a height of about 0.0625 to about 0.125 inch or less, and spaced at about one half to about two inches intervals between the pimple protrusions, thus for a perimeter of about thirty inches there could be from twenty to forty pimple protrusions, preferably on or near the lower rim of the down turned edge 9, so that such pimple protrusions 2 are coined into side wall of mounting panel stock 4, in groove 8, and dimples 7 are formed by the protrusions 2 as the edge 9 of decorative panel insert assembly 1 is embedded in the groove generated in mounting panel stock 4 on closing of the press mounted dies 5, 6.

The projecting flange edge 12 is best described as extending along the outer edge of lower rim of down turned edge 9 as shown in cross section elevation view FIG. 10. This projecting flange edge extends outward for about 0.03 to 0.125 inches, with about 0.05 inches preferred. This projecting flange edge 12 is on the outer lower rim, while the pimple protrusions 2 are on the inside of the down turned edge 9.

To insure proper and tight fit of the decorative panel insert assembly 1, the groove 8 should be of such width to cause a close or interference fit of the down turned edge 9 of the decorative panel 1 into the mounting panel stock 4, and of such depth to have the pimple protrusions 2 and projecting flange edge 12 coin into the side wall of the groove generated in the mounting panel stock 4. The final embedment of down turned edge 9, into the mounting panel stock 4 is as shown in FIG. 7, with the pimple protrusions 2 on the back edge of down turned edge 9, and projecting flange edge 12 on the outer edge down turned edge 9 of decorative panel insert assembly 1 coined into the groove wall of mounting panel stock 4, when platen dies 5 and 6 are forced together, by the press action and the dies at ambient or controlled temperature to solidify the heat softened mounting panel stock 4 with the decorated assembly 1, embedded therein.

The decorative overlay sheet 10, if desired can be a thermoplastic sheet such as polyvinyl adhered to the mounting panel stock 4. This decorative overlay sheet 10, may extend inward beyond groove 8, as shown in FIG. 4, and as noted in FIGS. 6, 7, and 8, the decorative sheet 10, extends inward beyond the edge of groove 8, and is crimped into groove 8, along with the down turned edge 9, of decorative panel insert assembly.

In the method and apparatus described above, the contour of the completed decorated panel is controlled by the compression die configuration on die platens 5 and 6.

Referring now to FIG. 9, this shows the platen die sections 5 and 6 in "open" press position, with die section 5 mounted on the movable platen for example, and die section 6 mounted on the stationary platen. The temperature of platen dies 5 and 6 are controlled in a conventional manner as required.

On attaching the decorative panel insert assembly 1, to the mounting panel stock 4, by action of the press to close the platen dies 5 and 6, the decorative panel insert assembly 1 is attached to the mounting panel stock 4, by embedment of the down turned edge 9 of the panel insert assembly 1 into the mounting panel stock 4 and the decorated panel with the decorated panel insert assembly 1 mounted therein, may be formed to a desired contour by the shape of the platen die sections 5 and 6 on closing of the press.

Having described my invention I claim:

1. A process for making a decorative panel, comprising:

softening a sheet of a mounting panel stock material;

placing the softened sheet onto a first die section of a compression press, so that the sheet overlies a groove in the first die section;

positioning a pre-formed, contoured decorative insert into conforming contact with a second die section of the compression press, the insert having a projecting edge configured to fit into the groove of the first die section; and pressing the insert and mounting panel into close conforming contact with each other between the first and second die sections so that the projecting edge of the insert extends into said groove under conditions effective to press an underlying portion of the softened sheet into the groove and thereby embed the projecting edge of the insert in the softened sheet, wherein the projecting edge presses the underlying portion of the softened sheet into the groove by itself without the aid of other forming means;

wherein the pressing step further comprises a step of pressing lateral protrusions formed on a rear side, and a flange edge formed on a front side, of the projecting edge of the insert into an outer surface of the heat-softened sheet disposed in the groove, which protrusions and flange edge coin into the sheet material in a manner effective to hinder removal of the embedded insert edge from the sheet.

2. The process of claim 1, wherein the sheet is made of a thermoplastic material, and the softening step further comprises heating the sheet.

3. The process of claim 1, wherein the sheet is made of a thermoplastic material, and the softening step further comprises heating the sheet.

4. The process of claim 3, further comprising forming the sheet material by bonding a decorative thermoplastic overlay having a central opening onto a sheet of thermoplastic material lacking such a central opening, wherein the central opening is covered by the decorative insert after the pressing step.

5. The process of claim 1, further comprising forming the sheet material by bonding a decorative thermoplastic overlay having a central opening onto a sheet of thermoplastic material lacking such a central opening, wherein the central opening is covered by the decorative insert after the pressing step.

6. The process of claim 1, further comprising forming the pre-formed, contoured decorative insert by bonding a thermoplastic backing to a surface material made of a fabric.

* * * * *